United States Patent
Tinsman

(10) Patent No.: US 10,152,815 B2
(45) Date of Patent: Dec. 11, 2018

(54) OVERLAY EMPHASIS MODIFICATION IN AUGMENTED REALITY DISPLAYS

(71) Applicant: OpenTV, Inc., San Francisco, CA (US)

(72) Inventor: John Tinsman, Fallbrook, CA (US)

(73) Assignee: OPENTV, INC., San Francisco, CA (US)

(*) Notice: Subject to any disclaimer, the term of this patent is extended or adjusted under 35 U.S.C. 154(b) by 0 days.

(21) Appl. No.: 15/407,435

(22) Filed: Jan. 17, 2017

(65) Prior Publication Data

US 2018/0204361 A1    Jul. 19, 2018

(51) Int. Cl.
| | |
|---|---|
| G06T 11/60 | (2006.01) |
| A63F 13/213 | (2014.01) |
| A63F 13/537 | (2014.01) |
| A63F 13/65 | (2014.01) |
| G06T 11/00 | (2006.01) |

(52) U.S. Cl.
CPC ............ *G06T 11/60* (2013.01); *A63F 13/213* (2014.09); *A63F 13/537* (2014.09); *A63F 13/65* (2014.09); *G06T 11/00* (2013.01)

(58) Field of Classification Search
CPC .......................... G06T 19/006; H04N 5/2628
See application file for complete search history.

(56) References Cited

U.S. PATENT DOCUMENTS

| | | |
|---|---|---|
| 5,913,591 A | 6/1999 | Melville |
| 6,257,727 B1 | 7/2001 | Melville |
| 8,670,000 B2 | 3/2014 | Braun et al. |
| 9,305,400 B2 | 4/2016 | Kochi et al. |
| 9,480,919 B2 | 11/2016 | Kalaboukis et al. |
| 2003/0118183 A1* | 6/2003 | Struyk ............... G06F 21/84 380/213 |
| 2006/0098029 A1 | 5/2006 | Clas |
| 2012/0127284 A1 | 5/2012 | Bar-zeev et al. |
| 2013/0031582 A1* | 1/2013 | Tinsman ............ H04N 21/2353 725/36 |
| 2013/0127980 A1 | 5/2013 | Haddick et al. |

(Continued)

FOREIGN PATENT DOCUMENTS

| | | |
|---|---|---|
| EP | 2886039 A1 | 6/2015 |
| WO | WO-2009122213 A2 | 10/2009 |

(Continued)

OTHER PUBLICATIONS

"U.S. Appl. No. 15/407,491, Response filed Jun. 19, 2018 to Non Final Office Action dated Mar. 19, 2018", 10 pgs.

(Continued)

*Primary Examiner* — Thomas Lett
(74) *Attorney, Agent, or Firm* — Schwegman Lundberg & Woessner, P.A.

(57) ABSTRACT

Example embodiments provide systems and methods for emphasis modification of an informational overlay in augmented reality displays. In an example method, an informational overlay is presented atop a scene on a display device. The informational overlay includes at least one of a graphical element or a textual element to partially obscure the scene. Scene change data indicating a change in the scene is accessed. Based on the scene change data, a visual emphasis on the display device of at least a portion of the informational overlay relative to the scene is modified.

29 Claims, 12 Drawing Sheets

(56) References Cited

U.S. PATENT DOCUMENTS

| | | |
|---|---|---|
| 2013/0339907 A1 | 12/2013 | Matas et al. |
| 2014/0132484 A1 | 5/2014 | Pandey et al. |
| 2015/0070388 A1 | 3/2015 | Sheaffer et al. |
| 2015/0146265 A1 | 5/2015 | Kim et al. |
| 2015/0249817 A1 | 9/2015 | Roelen et al. |
| 2016/0284134 A1 | 9/2016 | Kamhi et al. |
| 2016/0343116 A1* | 11/2016 | Park .................... G06T 3/40 |
| 2018/0204362 A1 | 7/2018 | Tinsman |

FOREIGN PATENT DOCUMENTS

| | | |
|---|---|---|
| WO | WO-2015102904 A1 | 7/2015 |
| WO | WO-2016139208 A1 | 9/2016 |
| WO | WO-2018136420 A1 | 7/2018 |
| WO | WO-2018136426 A1 | 7/2018 |

OTHER PUBLICATIONS

"International Application Serial No. PCT/US2018/013875, International Search Report dated May 28, 2018", 5 pgs.

"International Application Serial No. PCT/US2018/013875, Written Opinion dated May 28, 2018", 8 pgs.

"International Application Serial No. PCT/US2018/013893, International Search Report dated Jun. 1, 2018", 4 pgs.

"International Application Serial No. PCT/US2018/013893, Written Opinion dated Jun. 1, 2018", 6 pgs.

"U.S. Appl. No. 15/407,491, Examiner Interview Summary dated Aug. 2, 2018", 3 pgs.

"U.S. Appl. No. 15/407,491, Non Final Office Action dated Mar. 19, 2018", 9 pgs.

* cited by examiner

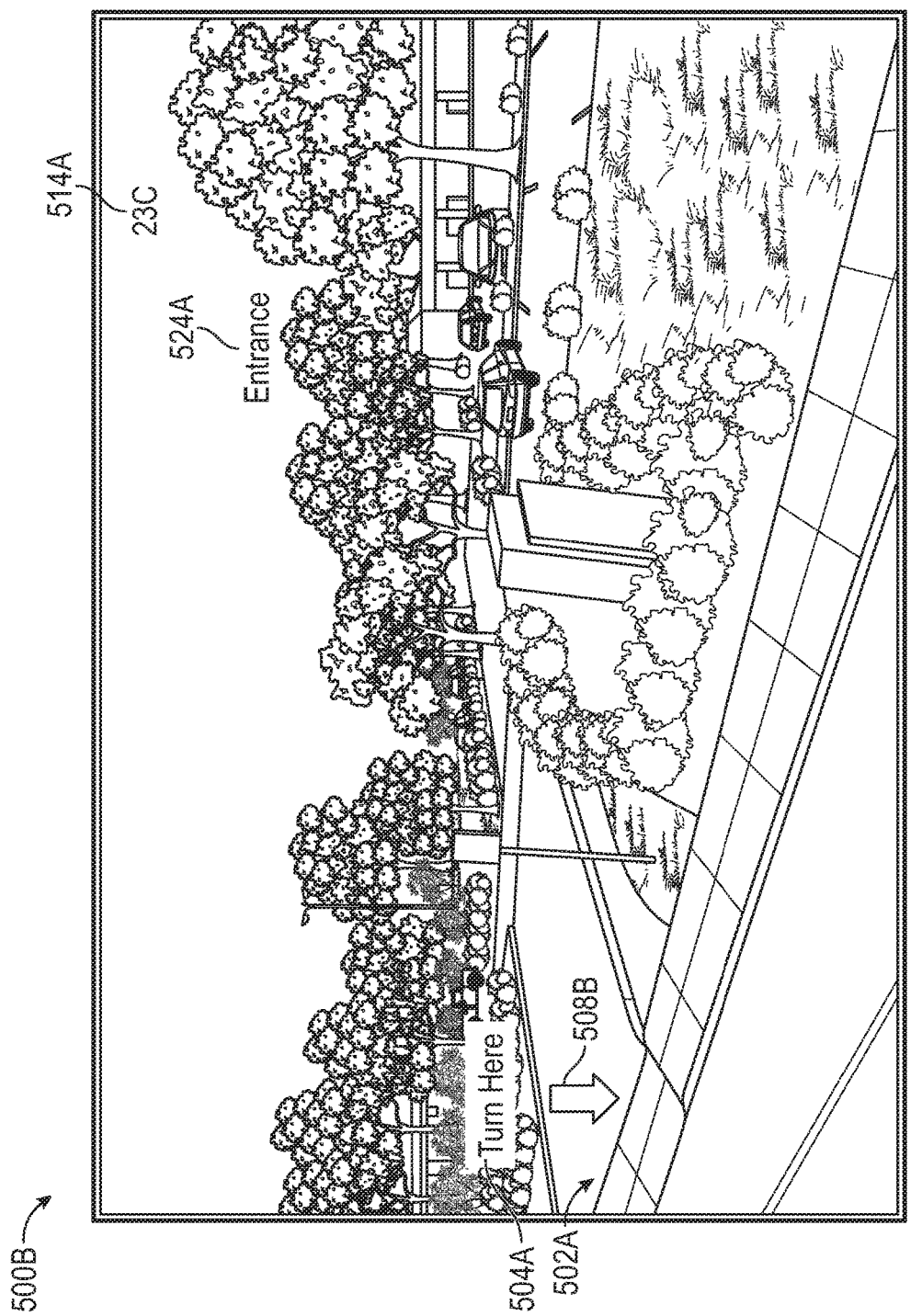

OVERLAY EMPHASIS MODIFICATION IN AUGMENTED REALITY DISPLAYS

FIELD

The present disclosure relates generally to information display technology and, in a specific example embodiment, to emphasis modification of an informational overlay in augmented reality displays.

BACKGROUND

Augmented reality (AR) displays have been employed in a wide variety of environments in which a displayed physical or virtual scene is augmented or enhanced with additional information (e.g., text, graphics, and so on) presented over the scene on the display from the perspective of the viewer. One example of an AR display is a heads-up display (HUD) for aircraft, automobiles, and the like, in which the information overlay is projected onto glass or another medium through which a user may view a physical scene, such as a roadway. Another example of an AR display is a display of a smart phone or tablet computer equipped with a camera such that a physical scene captured by the camera is presented on the display, with an informational overlay also being presented on the display over the scene. In another example of an AR display, a virtual scene, such as that presented in a first-person shooter (FPS) game, may be augmented with an informational overlay, with the virtual scene and the information overlay being presented on a video monitor, television, or the like.

In some situations, the informational overlay may obscure an area of interest within the scene, possibly rendering the informational overlay more of an impediment than an asset. For example, in an informational overlay that identifies points of interest (e.g., streets, stores, and so on), the portion of the informational overlay related to that point of interest may obscure part of the scene.

BRIEF DESCRIPTION OF DRAWINGS

Various ones of the appended drawings merely illustrate example embodiments of the present disclosure and cannot be considered as limiting in scope.

FIG. 5B is a graphical depiction of a scene related to the scene in FIG. 5A, in which an emphasis of the informational overlay is modified.

DETAILED DESCRIPTION

In the following description, for the purposes of explanation, numerous specific details are set forth in order to provide an understanding of various example embodiments of the present subject matter. It will be evident, however, to those skilled in the art, that example embodiments of the present subject matter may be practiced without these specific details.

Figure 1A:
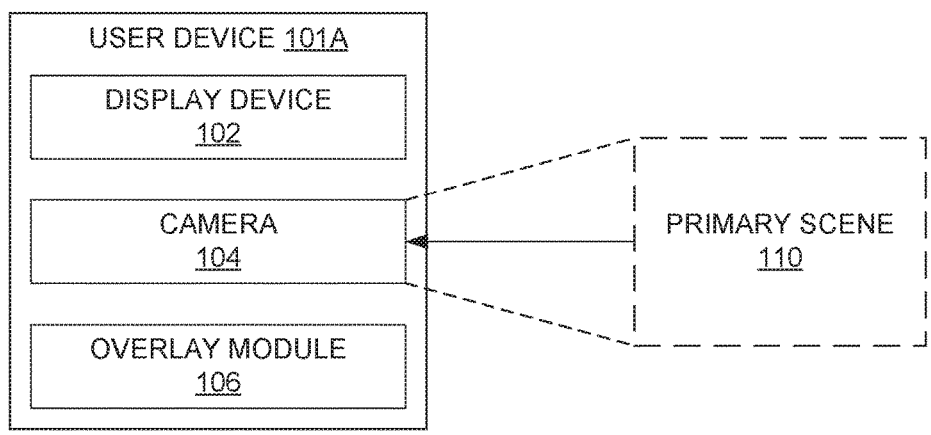
FIG. 1A is a block diagram of an example user device including a display device for displaying a scene captured via a camera upon which an informational overlay may be presented.
Figure 1B:
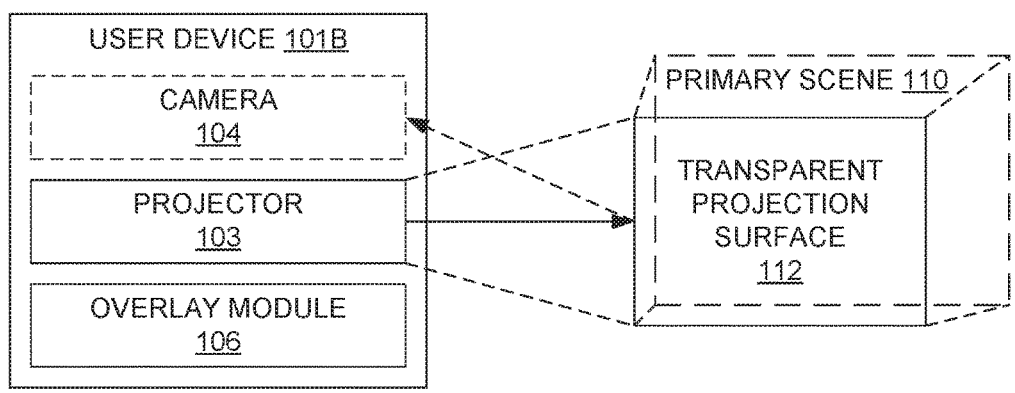
FIG. 1B is a block diagram of an example user device including a projector for projecting an informational overlay onto a transparent surface through which a scene may be viewed.
Figure 1C:
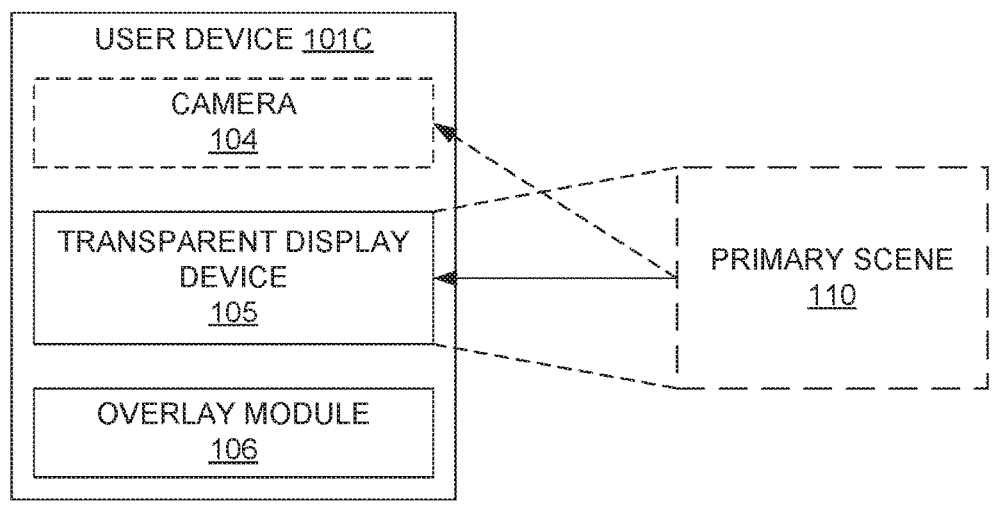
FIG. 1C is a block diagram of an example user device including a transparent display device that may present an information overlay and through which a scene may be viewed.

FIGS. 1A, 1B, and 1C are block diagrams of example user devices 101A, 101B, 101C (collectively, 101) by which an augmented reality (AR) display may be presented to a user, and thus may serve as platforms upon which example embodiments that are discussed in greater detail below may be provided. FIG. 1A is a block diagram of an example user device 101A including a display device 102 for displaying a scene (e.g., primary scene 110) captured via a camera 104, and for displaying a corresponding informational overlay. The user device 101A includes an overlay module 106 that may be configured to provide the informational overlay, such as text, graphics, and/or other visual elements, that is to be presented "atop" (e.g., appearing in front of, or on top of, and thus partially blocking or obscuring) a representation of the primary the scene 110 on the display device 102. The scene 110 is a representation of an actual or virtual environment (e.g., an outdoor or indoor view of a physical area, such as may be captured by way of a camera; a view of a virtual world from the point of view of a player in a gaming environment, and the like). In an example embodiment, the overlay module 106, which is described more fully below in conjunction with FIG. 2, may provide overlay emphasis modification, overlay contrast control, and other functions described below regarding the presentation of the informational overlay. Such functions may be aided, in some example embodiments, using data generated by the camera 104 in capturing the primary scene 110. In an example embodiment, the overlay module 106 may be configured to add to or replace one or more portions of images captured by the camera 104 prior to presenting the resulting composite images to a user via the display device 102. The display device 102, in various example embodiments, may be a flat panel display, such as a touchscreen, but other types of display devices 102 may be incorporated within the user device 101A in other embodiments. Example embodiments of the user device 101A may include, but are not limited to, portable devices, such as smart phones, tablet computers, virtual reality (VR) headsets, and so on. However, other example embodiments, including non-portable devices, such as desktop computers, as well as devices in which the camera 104 may be located external to the user device 101A, may also employ the various example embodiments of the overlay module 106 described hereafter.

FIG. 1B is a block diagram of an example user device 101B including a projector 103 for projecting an informational overlay onto a transparent projection surface 112 (e.g., glass, acrylic, and so forth) through which the primary scene 110 may be viewed. In this example, an overlay module 106 may generate the informational overlay and provide that overlay in a format used by the projector 103. In addition, the user device 101B may include a camera 104 to capture the primary scene 110 and employ the resulting data as input to the overlay module 106, as is described more fully below. An example embodiment of the user device 101B may be a heads-up display (HUD), which may be employed in terrestrial vehicles, aircraft, spacecraft, and so on. However, other types of user devices 101B employing the architecture depicted in FIG. 1B are also possible.

FIG. 1C is a block diagram of an example user device 101C including a transparent display device 105 that may present an informational overlay generated by an overlay module 106 and through which a primary scene 110 may be viewed. In an example embodiment, the transparent display device 105 may include light-emitting diodes (LEDs), such as organic LEDs (OLEDs), attached to or embedded within a transparent structure, such as glass or acrylic. As with the example embodiments of FIG. 1B, the user device 101C may also include a camera 104 to capture the primary scene 110 and generate data for use by the overlay module 106 to modify or otherwise process the informational overlay to be presented to the user. In an example embodiment, the user device 101C may be another type of heads-up display employable in vehicles, aircraft, and the like. In addition, the user device 101C, as well as the user device 101B of FIG. 1B, may be a gaming device such that each player employs a separate user device 101 through which they view a common screen of the action, and in which each user device 101 provides information intended solely for the corresponding player. In some example embodiments, the transparent display device 105 may include a shuttering structure (e.g., a liquid-crystal display (LCD) structure) or other light-blocking structure or system that may be controlled to cause partial or total blocking of all, or one or more portions, of the primary scene 110, from the perspective of the viewer, thus modifying the transparency of one or more portions of the transparent display device 105.

In example embodiments, other components aside from the display device 102, the projector 103, the camera 104, the overlay module 106, and so on may also be incorporated within the user device 101, such as a human-machine interface (HMI), a data storage device (e.g., flash memory, magnetic disk drive, optical disk drive, and so on), a wired or wireless communication interface (e.g., an interface for a wide-area network (WAN) (e.g., the Internet), a cellular network (e.g., third-generation (3G) or fourth-generation (4G) network), a cable television network, a satellite communication network, or any other communication network or connection, or combinations thereof), and so forth.

Figure 2:
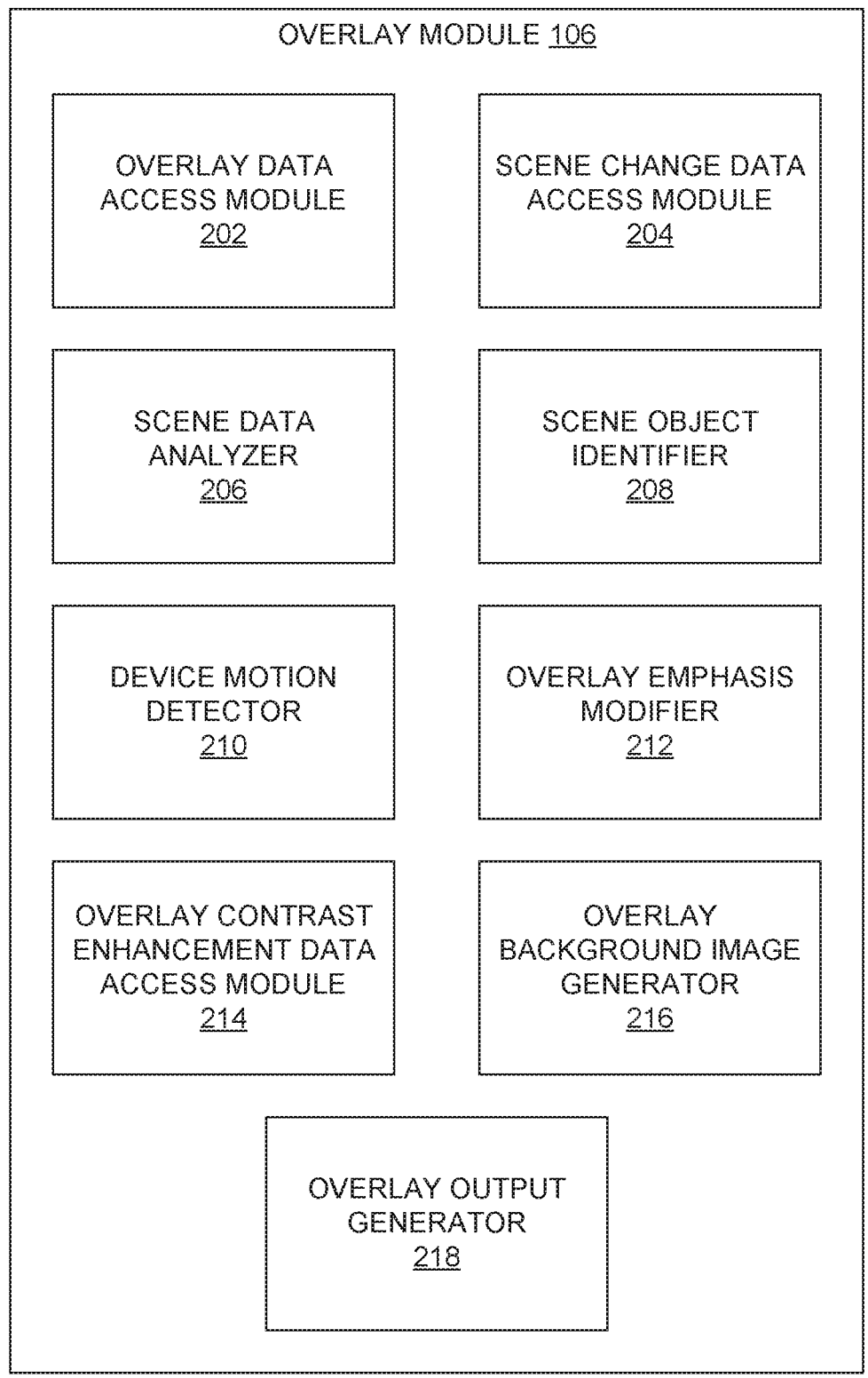
FIG. 2 is a block diagram of an example overlay module employable within one or more of the user devices of FIGS. 1A, 1B, and 1C.

FIG. 2 is a block diagram of an example overlay module 106 employable within one or more of the user devices 101A, 101B, 101C of FIGS. 1A, 1B, and 1C, as mentioned above. In an example embodiment, the overlay module 106 may include one or more of an overlay data access module 202, a scene change data access module 204, a scene data analyzer 206, a scene object identifier 208, a device motion detector 210, an overlay emphasis modifier 212, an overlay contrast enhancement data access module 214, an overlay background image generator 216, or an overlay output generator 218. In various example embodiments, the various modules 202-218 of the overlay module 106 may be implemented in hardware (e.g., logic circuits and other electronic components), in software or firmware in the form of instructions stored in a memory and configured to be executed on one or more hardware processors (e.g., microprocessors, microcontrollers, and the like), or some combination thereof. Also, depending on the particular user device 101 in which the overlay module 106 is implemented, fewer than all of the modules 202-218 may be implemented, and additional modules other than those explicitly depicted in FIG. 2 may be employed.

The overlay data access module 202 may be configured to access overlay data from a data source internal to, or external to, the overlay module 106 or the user device 101. In an example embodiment, the overlay data includes data that describes textual and/or graphical elements that are to be presented as an informational overlay over a scene 110 being displayed to a user. The overlay data, in an example embodiment, may specify the color, intensity, and/or other characteristics of each picture element (pixel) of the informational overlay in a compressed or uncompressed format.

In some example embodiments, the overlay data access module 202 may generate the overlay data using other accessible data, such as map data corresponding to the scene 110 being presented or viewed by the user. Further, the user device 101 may include a location detector (e.g., a Global Positioning System (GPS) receiver) and orientation sensor (e.g., one or more gyroscopic sensors) to determine a location and orientation of the user device 101, and correlate the determined location and orientation of the user device 101 with the map data to determine the overlay data. In other example embodiments, the overlay data access module 202 may employ image data (e.g., data from the camera 104) in combination with the map data to generate the overlay data.

In yet other example embodiments, the overlay data access module 202 may receive overlay data or related information concerning a physical or virtual environment depicted in the scene 110 being presented to the user of the user device 101. For example, the overlay data access module 202 may receive, from a game operating on the user device 101 or an external device, information regarding a location and orientation within a virtual gaming world and/or overlay data describing that location and orientation. The overlay module 106 may present the resulting informational overlay atop a view of the virtual gaming world to the user (e.g., via the display device 102).

The scene change data access module 204 may be configured to access or receive scene change data regarding the primary scene 110 from a module or component within, or external to, the overlay module 106. In an example embodiment, the scene change data may identify one or more areas or portions of the primary scene 110 that have changed over some period of time. Such information may also indicate how, by how much, or how quickly the one or more portions of the primary scene 110 have changed. Changes to the primary scene 110 may include changes in intensity, color, and other characteristics of one or more portions of the scene 110. As is described below, the scene change data may be employed to modify the informational overlay as presented to the user. In an example embodiment, the scene change data is stored in a data structure that may indicate one or more portions of the scene 110 that have changed, as well as possibly a magnitude of the change. In other example embodiments, the scene change data may not indicate changes (e.g., in object movement, in brightness, in color, and/or in other aspects) in the scene 110 that fall below some threshold value.

The scene data analyzer 206 may be configured to analyze data describing the primary scene 110 (e.g., data generated by the camera 104 or some device external to the user device 101), such as image capture data of a real or virtual environment depicted in the scene 110. The scene data analyzer 206 may then generate the scene change data that is accessed via the scene change data access module 204 described above. In an example embodiment, the scene data analyzer 206 may compare a current version of the scene 110 (e.g., a current image of the scene 110) and a previous version of the scene 110 to detect changes in the scene 110. Data describing those changes may be generated as scene change data. Other ways of analyzing the scene 110 and generating scene change data may also be employed in other example embodiments.

In another example embodiment, the scene data analyzer 206 may analyze data describing the primary scene 110 and generate data indicating one or more aspects of the current primary scene 110, as opposed to generating scene change data. For example, the scene data analyzer 206 may generate data correlating particular areas of the primary scene 110 with one or more values indicating color, brightness, complexity, and/or other visual aspects of each of the particular areas. In other example embodiments, the scene data analyzer 206 may generate data correlating particular areas of the primary scene 110 with one or more objects represented in the current primary scene 110. Other types of data describing the primary scene 110 may be generated in other example embodiments.

The scene object identifier 208 may be configured to detect one or more objects in a scene 110. Such objects may include manmade objects (e.g., vehicles, signage, streets, curbs, buildings, and so on), natural objects (e.g., trees, hills, ponds, and so forth), people, animals, and the like. The scene object identifier 208, in an example embodiment, may identify such objects by way of shape, color, visual texture, and other characteristics, possibly by way of comparing image data corresponding to a scene 110 with stored information describing one or more visual aspects of various objects. The scene object identifier 208, based on the detection of objects, may generate data indicating the presence of one or more objects detected in the scene 110, including a location of the object within the scene 110, a distance or range from the vantage point of the user device 101 to the object, and other information describing the object.

In an example embodiment, the scene object identifier 208 may identify one or more objects based on information provided, directly or indirectly, by the user. For example, the user may indicate a particular destination (e.g., by way of mapping software executing on the user device 101). Critical locations along that route, such as turns at intersections, the location of an entrance to the destination, and so forth), may be identified by the mapping software and forwarded to the scene object identifier 208. In turn, the scene object identifier 208, based on the physical appearance of the critical location, the captured data of the scene, the location and/or orientation of the user device 101, and possibly other information, may identify a particular area or portion of the scene 110 in which the critical location appears. Other ways of identifying one or more objects in the scene 110 are also possible. In an example embodiment, the scene object identifier 208 may forward an indication of the detected object data to the scene data analyzer 206, which may process that data to determine movement of one or more objects within the scene 110 over time. Such information may be included in the scene change data produced by the scene data analyzer 206.

In other examples, another system, device, or application may determine the object to be detected by the scene object identifier 208. For example, a gaming application may provide information regarding one or more objects (e.g., characters, physical items, and so on) being presented in the scene 110, such as their identity, location, range or distance, and other characteristics based on the actions of the user of the user device 101, other users, and so on.

In addition to indicating the location of an object within the scene 110, the scene object identifier 208 may determine a distance of the object from a particular vantage point, such as a distance from the user device 101 or the camera 104 capturing the scene 110. For example, a camera 104 may compare an apparent size of the object within the scene 110 to a known size of the object to determine the distance between the camera 104 and the object. In other example embodiments, the scene object identifier 208 may employ other object detection technologies, such as radar, sonar, lidar, and the like, to determine a distance or range to an object identified within the scene 110.

The device motion detector 210 may be configured to detect motion of the user device 101, such as translational and/or rotational movement of the user device 101, and generate data indicating such motion. The device motion detector 210 may include, for example, a GPS receiver, one or more gyroscopic sensors, and/or other components. In response to the detected motion, the device motion detector 210 may generate data indicative of the motion of the device 101, which may be provided to the scene data analyzer 206 for use in analyzing the scene 110. In other example embodiments, the generated motion data may be provided to the overlay emphasis modifier 212 and/or the overlay background image generator 216.

The overlay emphasis modifier 212 may be configured to modify one or more visual characteristics of the informational overlay being presented to the user (e.g., via the display device 102 or projector 103) to emphasize or deemphasize the informational overlay, or a portion thereof, over time. In an example embodiment, the overlay emphasis modifier 212 may modify a brightness, sharpness, color, size, line width, text font, or other characteristic of one or more portions of the informational overlay. For example, a portion of the informational overlay may be emphasized by increasing brightness or sharpness of a portion of the overlay, increasing a size or line width of one or more features of the overlay, increasing a font size or using a bold or underlined font of text in the overlay, changing a color of the overlay to contrast with the underlying scene, and so on. In addition, one or more characteristics of a portion of the informational overlay may be modulated over time (e.g., periodic "flashing" or "blinking" of a portion of the overlay) to emphasize that portion of the overlay. Conversely, deemphasizing at least a portion of the informational overlay may be accomplished via decreasing a brightness or sharpness (e.g., by blurring or defocusing) of the overlay, decreasing a size or line width of one or more features of the overlay, decreasing a font size of text in the overlay, using a color that is chromatically close to the underlying scene, and the like.

In some example embodiments, the emphasizing or deemphasizing of one or more portions or areas of an informational overlay may be based on a current state of the scene 110, or on a recent or current change to the scene 110. For example, a portion of the information overlay may be emphasized if a portion of the scene 110 presented under or behind the portion of the overlay is visually complex or is not of significant importance. Oppositely, the informational overlay, or a portion thereof, may be deemphasized in response to a corresponding portion of the scene 110 being important or time-critical in some way that warrants maximizing the visibility of that portion of the scene 110.

In an example embodiment, the overlay emphasis modifier 212 may receive scene change data from the scene change data access module 204 and emphasize or deemphasize one or more visual characteristics of at least a portion of the informational overlay in response to a change in the scene 110. More specifically, the scene change data may indicate a particular portion or area of the scene 110 that has undergone some kind of change. In response, the overlay emphasis modifier 212 may identify a portion of the informational overlay (e.g., a particular visual object, such as a text string or a graphical object) corresponding to the particular portion of the scene 110, and emphasize or deemphasize that portion of the overlay. For example, the overlay emphasis modifier 212 may determine that one or more portions of the overlay overlap the particular portion of the scene 110 undergoing a change, and then emphasize or deemphasize those one or more portions.

In an example embodiment, the scene change data may indicate a portion of the scene 110 corresponding to an object or location of interest (e.g., a point of interest, such as an entrance to a building or parking lot; a potential obstacle, a character in a game; and so on) located in the indicated portion of the scene 110. In an example embodiment, such information may be generated by the scene data analyzer 206 and/or the scene object identifier 208. In another example embodiment, the scene change data may determine an object or location of interest by accessing data in a database indicating typically busy locations or locations that may involve increased attention from the user (e.g., parking lots, intersections, sharp turns, and so on).

The operation of the overlay emphasis modifier 212, in an example embodiment, may depend on how the association of the object of interest with the scene 110 changes over the time, such as how the location of the object of interest within the scene 110 changes. For example, the overlay emphasis modifier 212 may respond to a detected object of interest by modifying one or more characteristics of the entire overlay, or of a portion of the overlay corresponding to the detected object. For example, if the object of interest enters or leaves a particular area of the scene 110 (e.g., a center portion of the scene 110), the overlay emphasis modifier 212 may reduce the brightness or otherwise deemphasize the portion of the overlay, or emphasize the portion of the overlay, corresponding to a central portion of the scene 110.

In another example embodiment, the overlay emphasis modifier 212 may modify an emphasis (e.g., emphasize or deemphasize) of all or a portion of the informational overlay in response to some change in a distance or range of an object of interest from the viewer, device 101, or another vantage point. For example, if the object of interest appears to encroach within some particular physical distance of the vantage point of the viewer (e.g., an object within a particular physical distance of the camera 104 or the user device 101) or within some virtual distance of the vantage point of the viewer (e.g., a virtual distance of a character from the viewer within the context of a game), the overlay emphasis modifier 212 may emphasize or deemphasize all or a portion of the informational overlay, such as a portion corresponding to a portion of the scene 110 corresponding to the object (e.g., the portion of the scene 110 occupied by the object). In another example embodiment, the overlay emphasis modifier 212 may emphasize or deemphasize all or a portion of the informational overlay in response to the object of interest exiting from a particular physical or virtual (e.g., perceived) distance between the vantage point of the viewer and the object.

The overlay emphasis modifier 212 may also modify one or more characteristics of all or a portion of the informational overlay, thus emphasizing or deemphasizing that portion of the overlay, in response to a particular magnitude of a scene change, as indicated in the scene change data. In an example embodiment, if a speed or acceleration of an object shown in the scene 110 exceeds, or falls below, some particular level, the overlay emphasis modifier 212 may emphasize or deemphasize all or a portion of the overlay accordingly. For example, an object in the scene 110 that is moving quickly, or accelerates quickly, may cause the overlay emphasis modifier 212 to deemphasize the overlay so that visibility of the object in the scene 110 may be enhanced, or the overlay emphasis modifier 212 may emphasize a single object indicator in the overlay to draw the attention of the user to the object.

In other examples, quick or slow translational or rotational movements of the device 101 (e.g., as detected via the device motion detector 210) may cause the overlay emphasis modifier 212 to emphasize or deemphasize all, or one or more portions, of the informational overlay. For example, the overlay emphasis modifier 212 may deemphasize the informational overlay during times in which the device 101 undergoes quick translational or rotational motions.

In another example embodiment, instead of relying on scene change data, the overlay emphasis modifier 212 may modify an emphasis (e.g., emphasize or deemphasize) of all or a portion of the informational overlay based on an analysis of data describing the current scene 110. For example, the overlay emphasis modifier 212 may receive data from one or more of the scene data analyzer 206 or the scene object identifier 208 indicating one or more aspects of the current scene 110, and modify an emphasis of all or a portion of the informational overlay relative to the current scene 110 based on that data. In an example embodiment, the overlay emphasis modifier 212 may perform the emphasis modification relative to a default or standard informational overlay based on initial scene data prior to the generation of scene change data.

Continuing with FIG. 2, modules such as the overlay contrast enhancement data access module 214 and the overlay background image generator 216, in conjunction with other modules of the overlay module 106, may cooperate to provide a background image between the scene 110 and the informational overlay to render the overlay, or one or more portions thereof, more readable or visible to the user of the user device 101. In an example embodiment, the overlay contrast enhancement data access module 214 may be configured to access or generate contrast enhancement data describing the background image to be used. For example, the background image may be a semi-transparent or semi-opaque (e.g., pixelated) background image of some color (e.g., black, gray, red, yellow, etc.) and/or brightness that allows at least some of the scene 110 to appear through the background image to be viewed by the user of the user device 101. In another example embodiment, the background image may be opaque to prevent any of the portion of the scene 110 corresponding to the background image from being viewed. Further, the background image described by the contrast enhancement data may or may not match the resolution of the scene 110. In an example embodiment, the overlay contrast enhancement data may provide a pattern that may then be repeated to cover some portion of the scene 110, as determined by the overlay background image generator 216.

The overlay background image generator 216 may be configured to determine a portion of the informational overlay under which the background or contrast image is to be presented. In example embodiments, the overlay background image generator 216 may determine the portion of the informational overlay based on information from one or more of the modules of the overlay module 106. For example, the overlay background image generator 216 may determine the portion of the overlay to be backed with the background image based on data from the scene data analyzer 206, such as data indicating a visual complexity of one or more portions of the scene 110. Based on the visual complexity of a portion of the scene 110 exceeding a particular threshold, the overlay background image generator 216 may identify a portion of the informational overlay corresponding to that portion of the scene 110 to which the background image is to be applied.

In another example embodiment, the overlay background image generator 216 may determine the portion of the informational overlay to be backed by the background image based on information from the device motion detector 210. For example, when the device motion detector 210 detects translational or rotational motion of the user device 101 that exceeds a particular threshold, the overlay background image generator 216 may determine that no portion of the informational overlay is to be backed by a background image, thus allowing at least portions of the informational overlay to be less discernible or readable while the user device 101 continues to exceed the threshold.

In yet another example embodiment, the overlay background image generator 216 may base its identification of the portion of the informational overlay on the scene change data discussed above, such as that accessed by the scene change data access module 204, or that generated by the scene data analyzer 206 or the scene object identifier 208. For example, in response to data identifying a location of an object of interest identified by the scene object identifier 208, the overlay background image generator 216 may identify a portion of the information overlay that signifies or identifies (e.g., by way of text, or an arrow or other graphic element) under which the background image is to be applied to provide additional contrast for that portion of the overlay. In an example embodiment, such additional contrast may be applied under particular circumstances involving the object of interest, such as entering or leaving a particular portion or area of the scene 110; encroaching within a particular distance of a vantage point, such as the vantage point of the user of the user device 101; exiting from a particular distance from the vantage point; and so forth, as described above.

The overlay background image generator 216, in an example embodiment, may determine the portion of the overlay to be backed by the background image based on a magnitude of a change in the scene, as determined by the scene data analyzer 206 and/or the device motion detector 210, exceeding or falling below some particular magnitude or level, as described above. For example, the overlay background image generator 216 may determine that no background image is warranted while the scene 110 is changing or moving quickly, while such a background image may be desirable during a more slowly changing scene 110.

In some example embodiments, the overlay background image generator 216 may vary over time the background image being applied over the scene 110, such as by way of turning on and off (e.g., flashing or blinking) the background image, altering the nature of the background image (e.g., via the overlay contract enhancement data being used), and so on to emphasize the portion of the overlay corresponding to the background image. In an example embodiment, the overlay background image generator 216 may reduce a darkness or otherwise alter one or more aspects of the background image (e.g., pattern, color, texture, etc.) over time, such in relation to the location of the corresponding portion of the overlay within the scene 110. For example, the darkness of the background image may be lessened as the corresponding portion of the overlay moves away from the center of the scene 110, or as the corresponding portion of the overlay moves more quickly within the scene 110, as the user device 110 moves more quickly, and so forth.

The overlay output generator 218 may be configured to cause presentation (e.g., via display device 102 of the user device 101A, the projector 103 of the user device 101B, and the transparent display device 105 of the user device 101C) of the informational overlay and/or the background image, as generated or modified by the overlay emphasis modifier 212 and/or the overlay background image generator 216. In some example embodiments, the overlay module 106 may include an overlay emphasis modifier 212 but no overlay background image generator 216, or vice-versa, with the overlay output generator 218 causing the presentation of the informational overlay being modified by the output from the module that is present in the overlay module 106 (e.g., the overlay emphasis modifier 212 or the overlay background image generator 216). In other example embodiments, the overlay module 106 may include both the overlay emphasis modifier 212 and the overlay background image generator 216, which may operate on the same scene 110. Consequently, the overlay output generator 218 may receive the output of both the overlay emphasis modifier 212 and the overlay background image generator 216 to be applied to the informational overlay and the associated scene 110 concurrently.

For example, the overlay module 106 (e.g., via the scene data analyzer 206, the scene object identifier 208, and/or the device motion detector 210) may determine that the scene 110 is currently undergoing a change that exceeds some threshold, such as by way of motion of objects detected in the scene, rotational or translational movement of the user device 101 itself, or the like. In response to those changes, the overlay emphasis modifier 212 may determine that at least a portion of the informational overlay should be deemphasized (e.g., less brightness, smaller text font, and so on). Concurrently in response to the same scene 110 changes, the overlay background image generator 216 may determine that a background image should not be employed, or such a background image should be modified to allow more of the underlying scene 110 to be visible. In response, the overlay output generator 218 may modify the background image and the informational overlay according to the output from both the overlay emphasis modifier 212 and the overlay background image generator 216 concurrently.

In another example embodiment, the overlay background image generator 216 and/or the overlay output generator 218 may be configured to relocate a portion of the informational overlay, such as one or more objects or elements of the overlay, to an area of the scene 110 that is more compatible with the use of a background image. For example, a particular element of the informational overlay may correspond with a portion of the scene 110 that is of some importance for viewing by the user, such as a central portion of the scene 110. In that example, the location within the scene 110 of the portion of the informational overlay for which the background image is to be employed may be moved to a more peripheral area of the scene, thus allowing the use of the background image without negatively impacting the visibility of the central portion of the scene 110.

In an example embodiment, the overlay output generator 218 may separately generate data or signals representing the informational overlay and the background image. For example, with respect to user device 101C, the overlay output generator 218 may provide data representing the informational overlay to the transparent display device 105 to produce the informational overlay (e.g., via LEDs), and may provide data representing the background image to the transparent display device 105 to partially or totally block light received from all of, or one or more portions of, the primary scene 110 (e.g., via an LCD structure or system coupled with the transparent display device 105).

Figure 3:
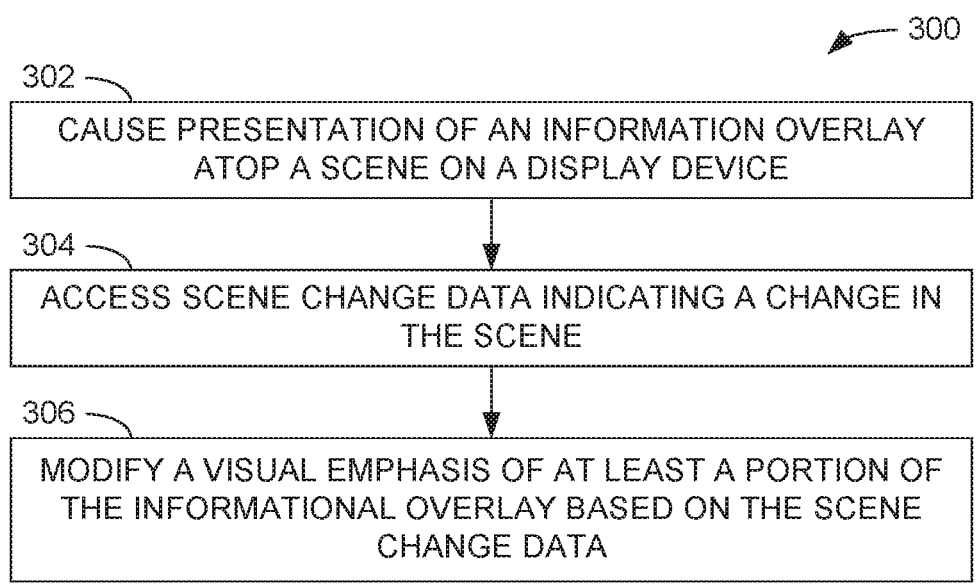
FIG. 3 is a flow diagram of an example method of modifying an emphasis of an informational overlay in an augmented reality display.

FIG. 3 is a flow diagram of an example method 300 of modifying an emphasis of an informational overlay in an augmented reality display. While the method 300 and other methods discussed below are described as being performed by the overlay module 106 and the various modules included therein, the method 300 may be performed by other structures not explicitly described herein. Also, while the operations of the method 300 of FIG. 3 and others discussed below are presented in a particular order, other orders of execution are also possible, including simultaneous, concurrent, or overlapping execution of two or more operations.

In the method 300, the overlay module 106 may cause the presentation of an informational overlay atop a scene 110 on a display device (e.g., via the overlay output generator 218 on the display device 102 of the user device 101A, on the transparent projection surface 112 via the projector 103 of the user device 101B, or in the transparent display device 105 of the user device 101C, via data from the overlay data access module 202) (operation 302). Scene change data indicating a change in the scene 110 may be accessed (e.g., via the scene change data access module 204) (operation 304). A visual emphasis (e.g., emphasizing or deemphasizing) of at least a portion of the informational overlay may be modified (e.g., via the overlay emphasis modifier 212, based on data from the scene data analyzer 206, the scene object identifier 208, and/or the device motion detector 210) based on the scene change data (operation 306). In other example embodiments, the visual emphasis of at least a portion of the informational overlay may be based on data indicating one or more aspects of the current scene 110, as opposed to scene change data.

Figure 4A:
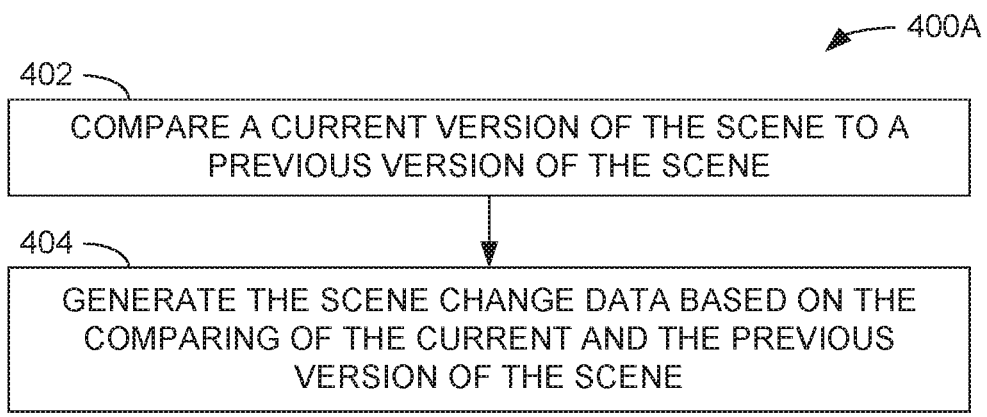
FIGS. 4A and 4B are data flow diagrams of example methods of generating scene change data for modifying an emphasis of an informational overlay.
Figure 4B:
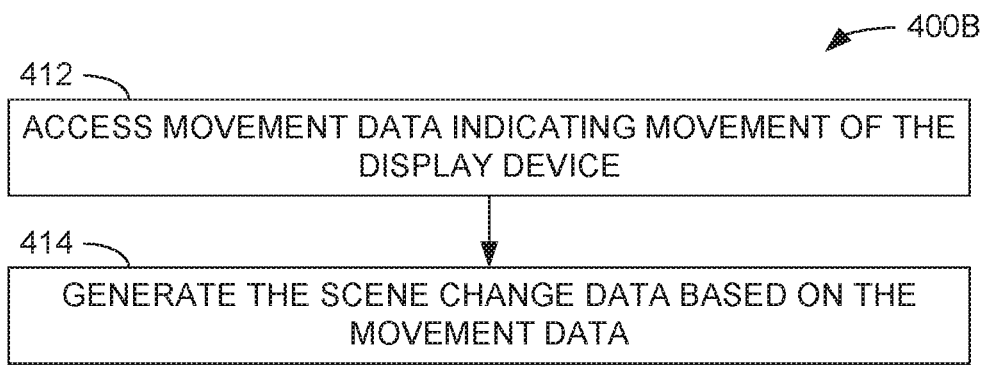

FIGS. 4A and 4B are data flow diagrams of example methods 400A, 400B of generating scene change data for modifying an emphasis of an informational overlay. In the method 400A, a current version of the scene 110 may be compared to a previous version of the scene 110 (e.g., by the scene data analyzer 206 or the scene object identifier 208) (operation 402), and the scene change data may be based on that comparison (operation 404). In the method 400B, movement data indicating movement of a display device (e.g., the display device 102 of the user device 101A, the projector 103 of the user device 101B (or the transparent projection surface 112 associated therewith), or the transparent display device 105 of the user device 101C) may be accessed (e.g., via the device motion detector 210) (operation 412). The scene change data may be generated based on the movement data (operation 414), as described above.

Figure 5A:
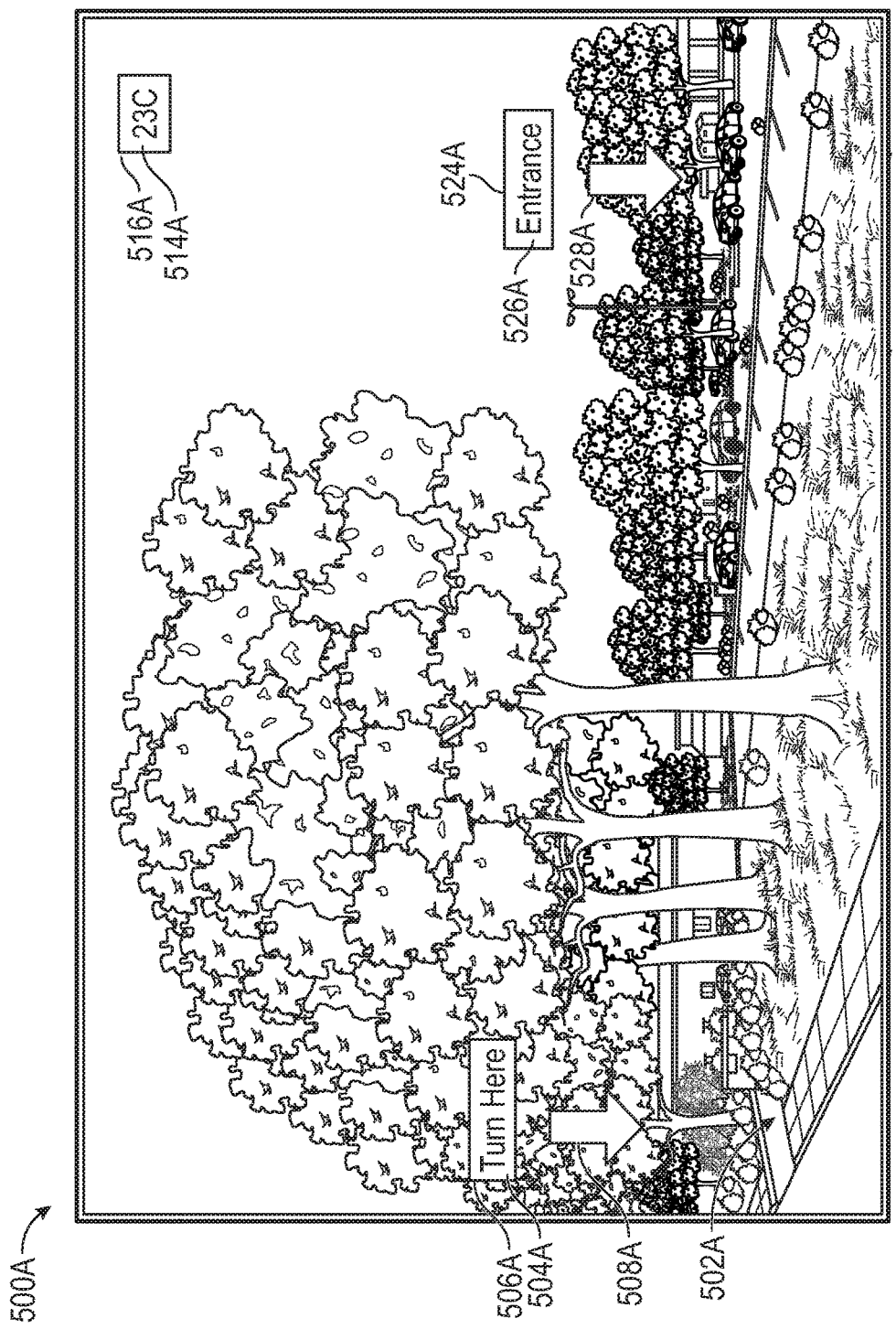
FIG. 5A is a graphical depiction of a scene with an informational overlay.

FIG. 5A is a graphical depiction of a scene 500A with an example informational overlay. The scene 500A is a view of a street scene that includes an entrance 502A to a parking lot for a business of interest to the user. The related informational overlay includes several elements providing guidance to the user so that the user may navigate to the parking lot and the associated business. More particularly, the informational overlay includes an arrow 508A indicating the location of the parking lot entrance 502A, text providing instructions 504A ("Turn Here") directing the user to turn at the parking lot entrance 502A, and a graphic element 506A (a box) highlighting the text instructions 504A. The informational overlay further includes an arrow 528A to the building entrance of interest, a textual label 524A ("Entrance") for the building entrance, and a graphic element 526A highlight the textual label 524A. A textual label 514A (e.g., suite number) for the building entrance ("23C") and an associated graphic element 516A are also included in the informational overlay.

FIG. 5B is a graphical depiction of a scene 500B related to the scene 500A in FIG. 5A, in which an emphasis of the informational overlay is modified. As the user approaches the parking lot entrance 502A, the entrance 502A appears to be closer to the user in the scene 500B than in the previous scene 500A. Such difference in appearance may be detected and indicated by the scene object identifier 208 and/or the scene data analyzer 206, which may determine that the apparent size of the parking lot entrance 502A has increased, and/or the location of the parking lot entrance 502A is more centrally located within the current scene 500B. In another example, a GPS receiver of the user device 101 may indicate that the location of interest is within some particular distance to the user device 101. In response, the overlay emphasis modifier 212 may determine that at least the overlay elements associated with the parking lot entrance 502A (e.g., the arrow 508A, the textual instructions 504A, and/or the associated graphic element 506A) should be deemphasized to enhance the visibility of the parking lot entrance 502A in the scene. As shown in FIG. 5B, this deemphasis may include turning the resulting arrow 508B less colorful or more translucent, and removing the corresponding graphic element 506A entirely, leaving only the text instructions 504A intact. Similarly, the textual label 514A for the suite number and the textual label 524A for the building entrance may be left intact, but the arrow 528A and the graphic elements 516A and 526A of the original scene 500A have been removed entirely in current scene 500B. Other methods of emphasizing or deemphasizing various portions of the informational overlay may be employed in other embodiments.

Figure 6:
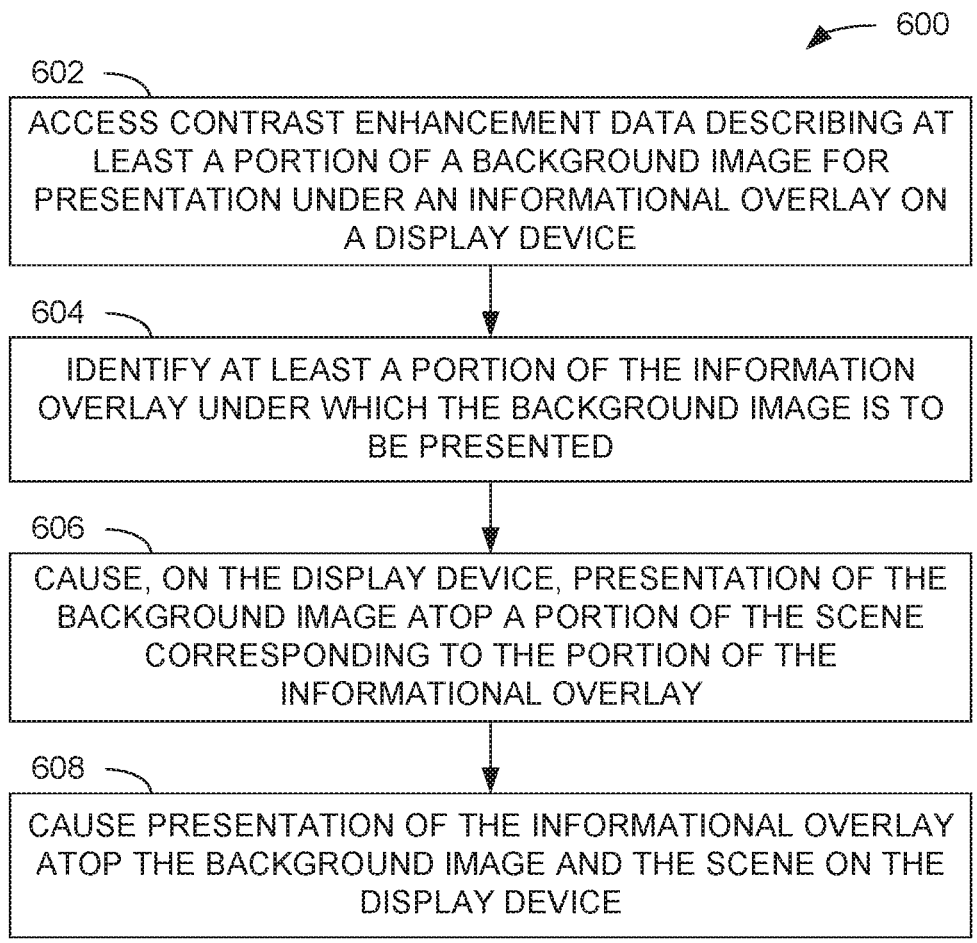
FIG. 6 is flow diagram of an example method of providing contrast control for an informational overlay in an augmented reality display.

FIG. 6 is flow diagram of an example method 600 of providing contrast control for an informational overlay in an augmented reality display. In the method 600, contrast enhancement data describing at least a portion of a background image for presentation under an informational overlay is accessed (e.g., via the overlay contrast enhancement data access module 214) (operation 602). At least a portion of the information overlay under which the background image is to be presented is identified (e.g., using the scene data analyzer 206, the scene object identifier 208, and/or the device motion detector 210) (operation 604). The overlay background image generator 216 may cause presentation of the background image atop a portion of the scene 110 corresponding to the portion of the informational overlay (operation 606). Further, the overlay output generator 218 may cause presentation of the information overlay atop the background image and the scene 110 (operation 608).

Figure 7:
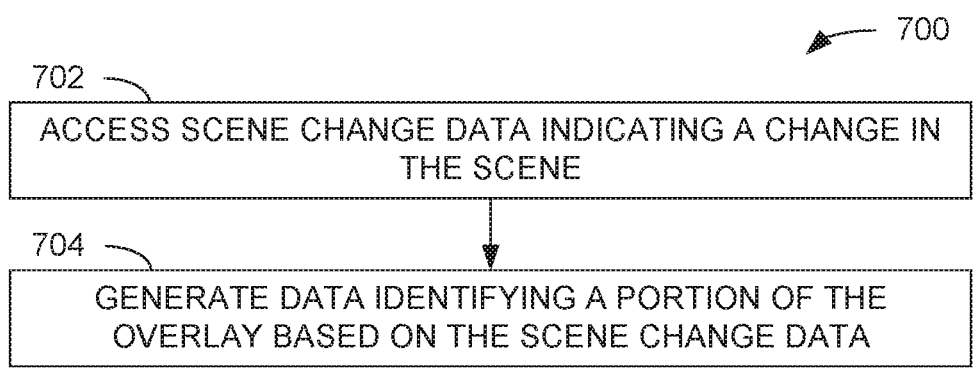
FIG. 7 is a flow diagram of an example method of employing scene change data to modify contrast enhancement data used to provide contrast control for an informational overlay.

FIG. 7 is a flow diagram of an example method 700 of employing scene change data to modify contrast enhancement data used to provide contrast control for an informational overlay. In the method 700, scene change data indicating a change in the scene 110 may be accessed (e.g., via the scene change data access module 204) (operation 702). Data identifying a portion of the overlay under which the background image is to be presented is generated based on the scene change data (e.g., via the overlay background image generator 216, based on data from the scene data analyzer 206, the scene object identifier 208, and/or the device motion detector 210) (operation 704). In other example embodiments, the data identifying a portion of the overlay under which the background image is to be presented is generated based on data describing one or more aspects (e.g., color, brightness, complexity, object location, object type, etc.) of the current scene 110, as opposed to scene change data.

Figure 8:
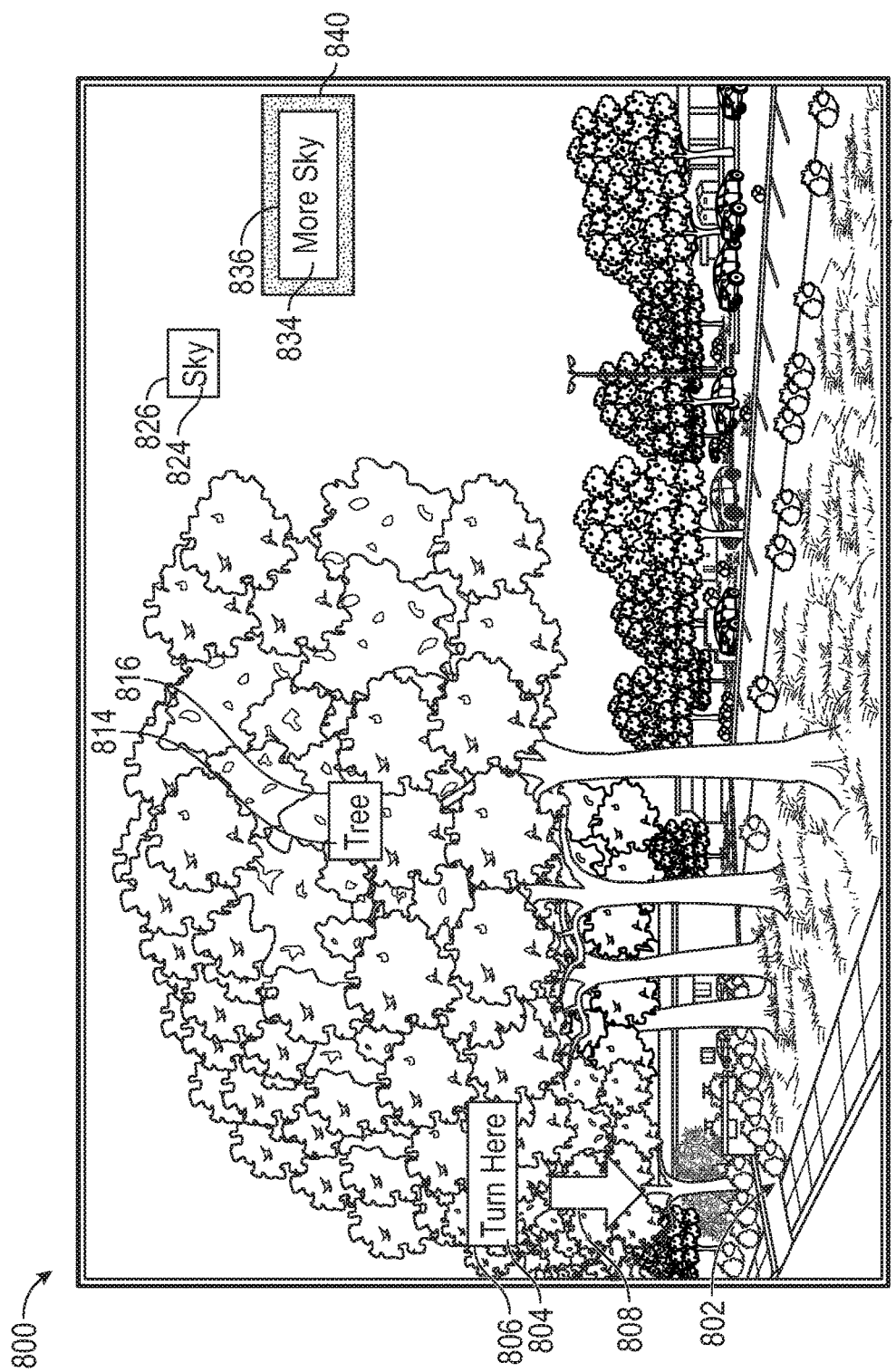
FIG. 8 is a graphical representation of a scene upon which an informational overlay is provided, showing contrast enhancement of a portion of the informational overlay by way of a background image.

FIG. 8 is a graphical representation of a scene 800 upon which an informational overlay is provided, showing contrast enhancement of a portion of the informational overlay by way of a background image. Aspects of the scene 800 are similar to those of the scene 500A, described above, in which a parking lot entrance 802 of interest is denoted by way of an arrow 808, instructional text 804 ("Turn here"), and graphic element 806 (e.g., a box) of an informational overlay. A text label 814 ("Tree") and associated graphic element 816 denote a tree in the scene 800, while two labels 824, 834 ("Sky" and "More Sky") and corresponding graphic elements 826, 836 are also included in the informational overlay.

Also illustrated in FIG. 8 is a background image 840 that appears atop the scene 800 and behind the "More Sky" label 834 and associated graphic element 836 to demonstrate the use of the background image 840 to increase the contrast of the label 834 and graphic element 836, thus increasing the readability or visibility of those portions of the overlay relative to other portions of the overlay, such as, for example, the label 824 and associated graphic element 826, in which the corresponding portion of the scene 800 (e.g., the blue sky) renders those elements 824, 826 less readable. The textual instruction 804, label 814, and corresponding graphic elements 806, 816 may also be considered less readable or visible due to the visually complex portion of the scene (e.g., the tree) backing those particular elements of the overlay. As mentioned above, the particular portion of the informational overlay under which the background image 840 is presented may be based on several different factors in other embodiments, such as the movement of objects of interest into or out of one or more areas of the scene 800, the movement of objects toward and away from a particular vantage point (e.g., the user device 101), movement of the user device 101, and the like.

Figure 9A:
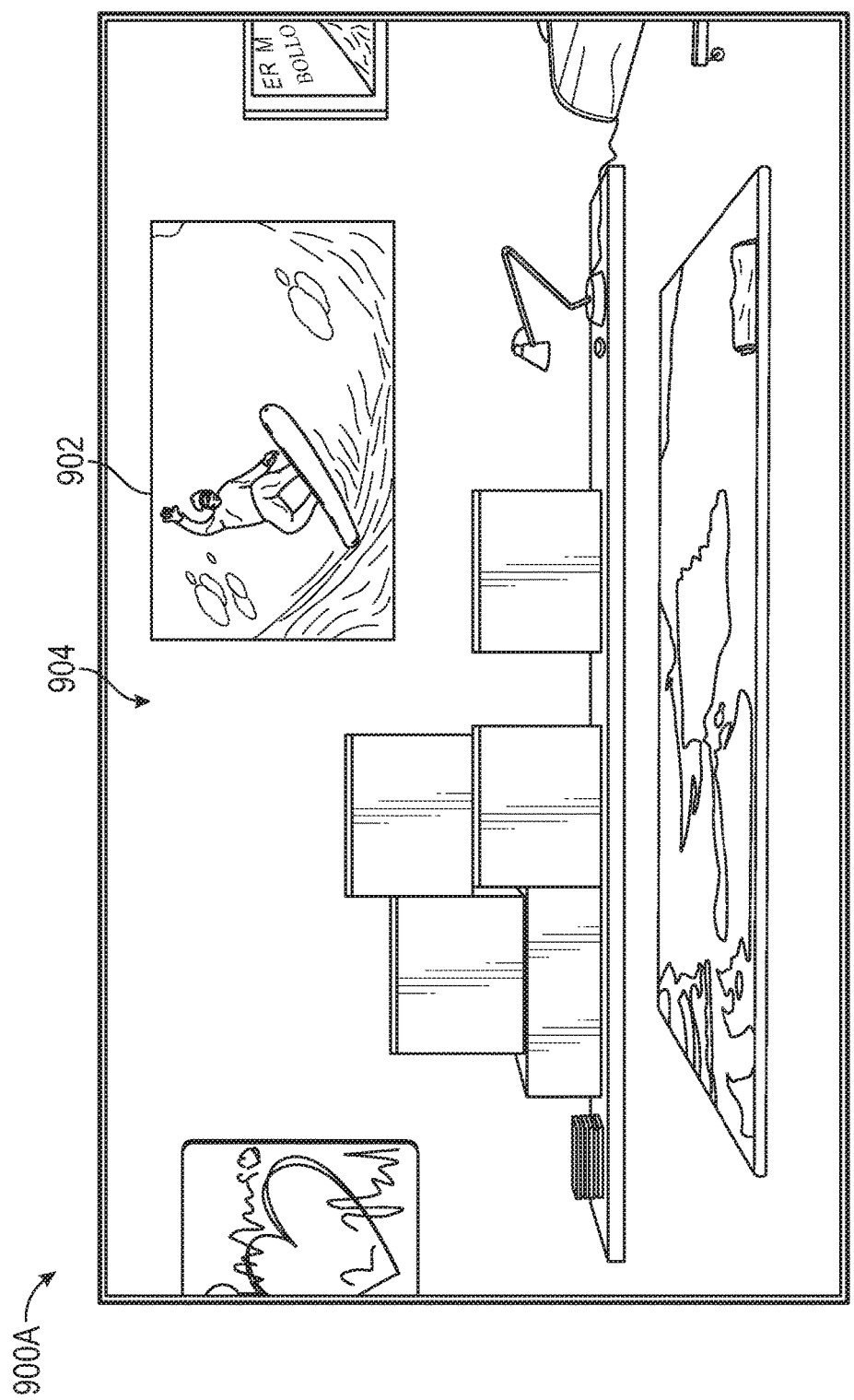
FIG. 9A is a graphical representation of a scene upon which a virtual video display is presented without contrast enhancement.

FIG. 9A is a graphical representation of a scene 900A upon which a virtual video display 902 is presented without contrast enhancement. More specifically, the virtual video display 902 (e.g., a video clip) of FIG. 9A is displayed directly atop a white wall 904 in the scene 900A. Presuming the virtual video display 902 is configured to allow at least a portion of the wall 904 of the scene 900A to appear through the virtual video display 902, the virtual video display 902 may appear overly bright or "washed out," thus reducing the ability of a viewer to observe at least some of the finer or more detailed aspects of the image being shown via the virtual video display 902.

Figure 9B:
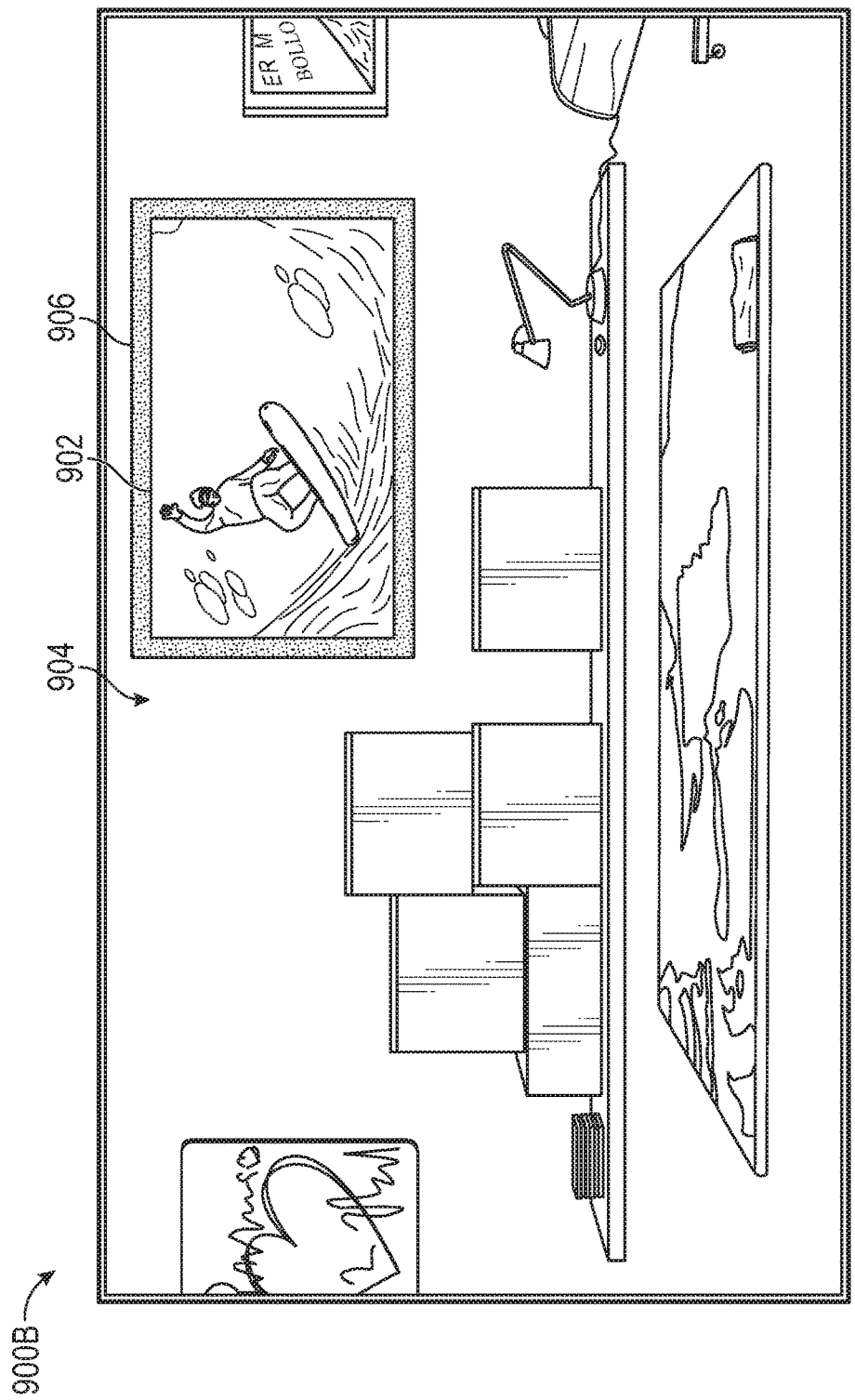
FIG. 9B is a graphical representation of the scene of FIG. 9A upon which a virtual video display is presented with contrast enhancement.

FIG. 9B is a graphical representation of the scene 900A of FIG. 9A upon which the virtual video display 902 is presented with contrast enhancement. More specifically, atop the resulting scene 900B has been rendered a background image 906, upon which the virtual video display 902 is presented, resulting in a display with greater perceived contrast. In this particular example embodiment, the background image 906 is a gray pixelated image that partially blocks from view the portion of the scene 900B underlying the virtual video display 902. Further, in the example embodiment of FIG. 9B, the resolution of the background image 906 is less than that of the scene 900B itself, although the resolution of other background images may be equal to or greater than that of the corresponding scene.

In view of at least some of the example embodiments described above, all or portions of an informational overlay, such as that employed in an AR display, may be emphasized or deemphasize by way of alteration of one or more aspects of the informational overlay. Further, the visual contrast of all or portions of the overlay may be modified by way of the use of a background image. Such modifications may be based on the particular status of the underlying scene, changes in the scene, and other factors. By altering the visual aspects of an overlay in such a manner, the overall usefulness to the user of the overlay may be enhanced.

Figure 10:
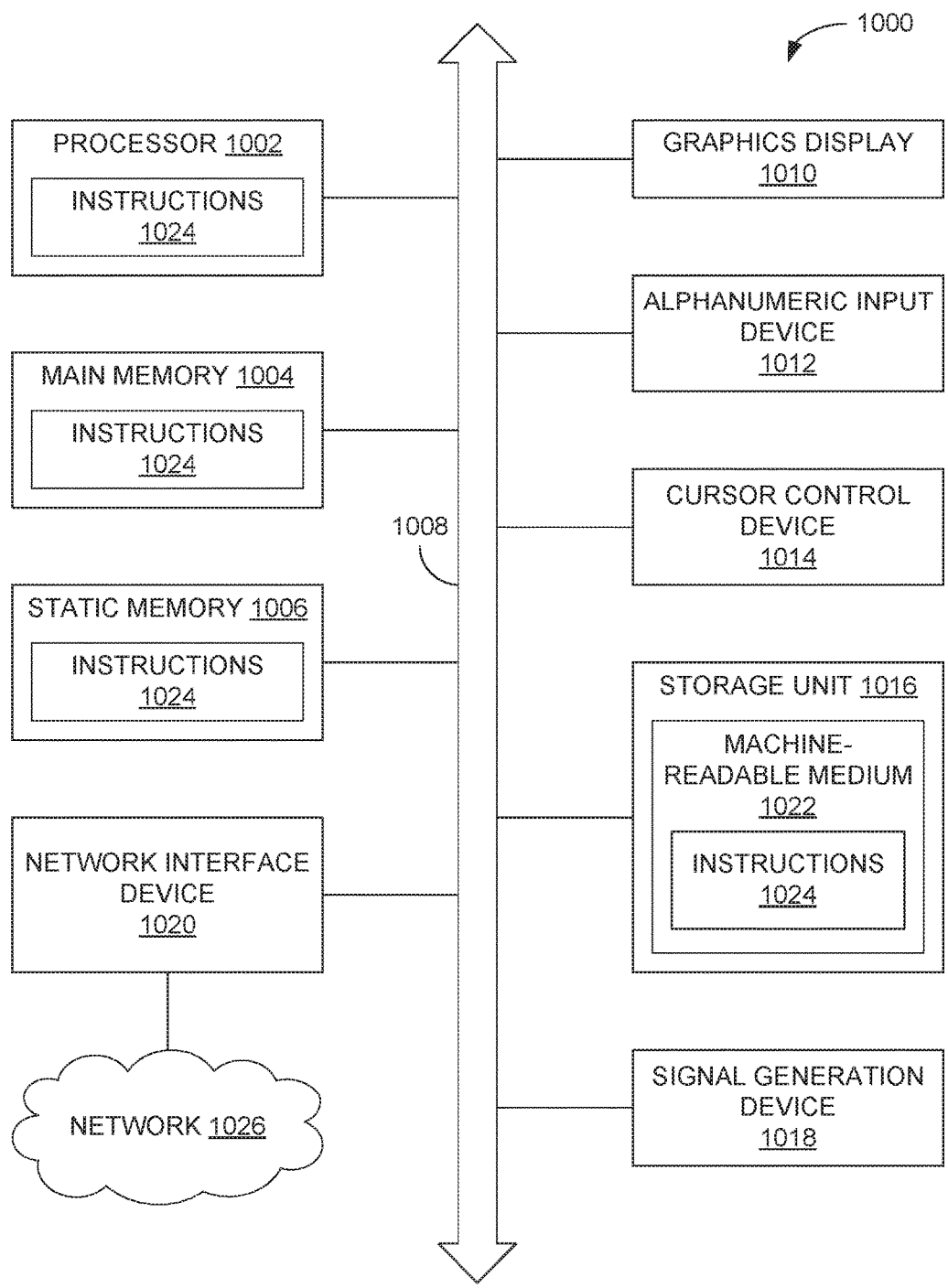
FIG. 10 is a simplified block diagram of a machine in an example form of a computing system within which a set of instructions for causing the machine to perform any one or more of the methodologies discussed herein may be executed.

FIG. 10 is a block diagram illustrating components of a machine 1000, according to some example embodiments, able to read instructions 1024 from a machine-readable medium 1022 (e.g., a non-transitory machine-readable medium, a machine-readable storage medium, or a computer-readable storage medium) and perform any one or more of the methodologies discussed herein, in whole or in part. Specifically, FIG. 10 depicts the machine 1000 in the example form of a computer device (e.g., a computer) within which the instructions 1024 (e.g., software, firmware, a program, an application, an applet, an app, or other executable code) for causing the machine 1000 to perform any one or more of the methodologies discussed herein, in whole or in part.

For example, the instructions 1024 may cause the machine 1000 to execute the flow diagrams of FIGS. 3, 4A, 4B, 6, and 7, as well as all example embodiments associated therewith. The instructions 1024 can transform the general, non-programmed machine 1000 into a particular machine (e.g., specially configured machine) programmed to carry out the described and illustrated functions in the manner described. Also, in example embodiments, the machine 1000 may operate as one or more of the modules 202-218 of the overlay module 106 of FIG. 2, as well as the one or more of the user devices 101A through 101C of FIGS. 1A through 1C, or any other computing system or device described herein.

In example embodiments, the machine 1000 operates as a standalone device or may be connected (e.g., networked) to other machines. The machine 1000 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, a power adapter, or any machine 1000 capable of executing the instructions 1024, sequentially or otherwise, that specify actions to be taken by that machine 1000. Further, while only a single machine 1000 is illustrated, the term "machine" shall also be taken to include a collection of machines that individually or jointly execute the instructions 1024 to perform any one or more of the methodologies discussed herein.

The machine 1000 includes a processor 1002 (e.g., a central processing unit (CPU), a graphics processing unit (GPU), a digital signal processor (DSP), an application-specific integrated circuit (ASIC), a radio-frequency integrated circuit (RFIC), or any suitable combination thereof), a main memory 1004, and a static memory 1006, which are configured to communicate with each other via a bus 1008. The processor 1002 may contain microcircuits that are configurable, temporarily or permanently, by some or all of the instructions 1024 such that the processor 1002 is configurable to perform any one or more of the methodologies described herein, in whole or in part. For example, a set of one or more microcircuits of the processor 1002 may be configurable to execute one or more modules (e.g., software modules) described herein.

The machine 1000 may further include a graphics display 1010 (e.g., a plasma display panel (PDP), a light-emitting diode (LED) display, a liquid crystal display (LCD), a projector, a cathode ray tube (CRT), or any other display capable of displaying graphics or video). The machine 1000 may also include an alphanumeric input device 1012 (e.g., a keyboard or keypad), a cursor control device 1014 (e.g., a mouse, a touchpad, a trackball, a joystick, a motion sensor, an eye tracking device, or other pointing instrument), a storage unit 1016, a signal generation device 1018 (e.g., a sound card, an amplifier, a speaker, a headphone jack, or any suitable combination thereof), and a network interface device 1020.

The storage unit 1016 includes the machine-readable medium 1022 (e.g., a tangible machine-readable storage medium) on which is stored the instructions 1024 embodying any one or more of the methodologies or functions described herein. The instructions 1024 may also reside, completely or at least partially, within the main memory 1004, within the processor 1002 (e.g., within a cache memory of the processor 1002), or both, before or during execution thereof by the machine 1000. Accordingly, the main memory 1004 and the processor 1002 may be considered machine-readable media 1022 (e.g., tangible and non-transitory machine-readable media).

In some example embodiments, the machine 1000 may be a portable or mobile computing device and have one or more additional input components (e.g., sensors or gauges). Examples of such input components include an image input component (e.g., one or more cameras), an audio input component (e.g., a microphone), a direction input component (e.g., a compass), a location input component (e.g., a Global Positioning System (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium 1022 able to store data temporarily or permanently and may be taken to include, but not be limited to, random-access memory (RAM), read-only memory (ROM), buffer memory, flash memory, and cache memory. While the machine-readable medium 1022 is shown in an example embodiment to be a single medium, the term "machine-readable medium" should be taken to include a single medium or multiple media (e.g., a centralized or distributed database, or associated caches and servers) able to store instructions 1024. The term "machine-readable medium" shall also be taken to include any medium, or combination of multiple media, that is capable of storing instructions 1024 for execution by a machine (e.g., machine 1000), such that the instructions 1024, when executed by one or more processors of the machine 1000 (e.g., processor 1002), cause the machine 1000 to perform any one or more of the methodologies described herein. The term "machine-readable medium" shall accordingly be taken to include, but not be limited to, one or more data repositories in the form of a solid-state memory, an optical medium, a magnetic medium, or any suitable combination thereof.

Furthermore, the machine-readable medium 1022 is non-transitory in that it does not embody a propagating or transitory signal. However, labeling the machine-readable medium 1022 as "non-transitory" should not be construed to mean that the medium is incapable of movement; the medium should be considered as being transportable from one physical location to another in some example embodiments. Additionally, since the machine-readable medium 1022 is tangible, the medium may be considered a machine-readable device.

The instructions 1024 may further be transmitted or received over a communications network 1026 using a transmission medium via the network interface device 1020 and utilizing any one of a number of well-known transfer protocols (e.g., Hypertext Transfer Protocol (HTTP)). Examples of communication networks 1026 include a local area network (LAN), a wide area network (WAN), the Internet, mobile telephone networks, plain old telephone service (POTS) networks, and wireless data networks (e.g., Wi-Fi®, LTE®, and WiMAX™ networks). The term "transmission medium" shall be taken to include any intangible medium that is capable of storing, encoding, or carrying instructions 1024 for execution by the machine 1000, and includes digital or analog communications signals or other intangible medium to facilitate communication of such software.

In an example embodiment, a computerized method comprises causing presentation of an informational overlay atop a scene on a display device, the informational overlay comprising at least one of a graphical element or a textual element to partially obscure the scene; accessing, using at least one of one or more hardware processors, scene change data indicating a change in the scene; and modifying, using at least one of the one or more hardware processors, based on the scene change data, a visual emphasis of at least a portion of the informational overlay on the display device relative to the scene.

In another example embodiment, including all previous example embodiments, the method further comprises causing presentation of the scene on the display device.

In another example embodiment, including all previous example embodiments, the modifying of the visual emphasis of the at least a portion of the informational overlay comprises altering a brightness of the at least a portion of the informational overlay.

In another example embodiment, including all previous example embodiments, the modifying of the visual emphasis of the at least a portion of the informational overlay comprises altering a sharpness of the at least a portion of the informational overlay.

In another example embodiment, including all previous example embodiments, the at least a portion of the informational overlay comprises text, and the modifying of the visual emphasis of the at least a portion of the informational overlay comprises altering a font of the text.

In another example embodiment, including all previous example embodiments, the modifying of the visual emphasis of the at least a portion of the informational overlay comprises modifying a color of the at least a portion of the informational overlay.

In another example embodiment, including all previous example embodiments, the scene change data comprises an indication of a portion of the scene, and the method further comprises identifying the at least a portion of the informational overlay based on the indicated portion of the scene.

In another example embodiment, including all previous example embodiments, the at least a portion of the informational overlay at least partially overlaps the indicated portion of the scene.

In another example embodiment, including all previous example embodiments, the indication of the portion of the scene comprises an indication of an object of interest in the scene.

In another example embodiment, including all previous example embodiments, the modifying of the visual emphasis of the at least a portion of the informational overlay occurs in response to the object of interest entering a particular area of the scene.

In another example embodiment, including all previous example embodiments, the modifying of the visual emphasis of the at least a portion of the informational overlay occurs in response to the object of interest exiting a particular area of the scene.

In another example embodiment, including all previous example embodiments, the modifying of the visual emphasis of the at least a portion of the informational overlay occurs in response to the object of interest encroaching within a particular perceived distance to a vantage point of the scene.

In another example embodiment, including all previous example embodiments, the modifying of the visual emphasis of the at least a portion of the informational overlay occurs in response to the object of interest exiting from a particular perceived distance to a vantage point of the scene.

In another example embodiment, including all previous example embodiments, the modifying of the visual emphasis of the at least a portion of the informational overlay occurs in response to the scene change data indicating a magnitude of the change in the scene exceeding a particular level during a period of time.

In another example embodiment, including all previous example embodiments, the modifying of the visual emphasis of the at least a portion of the informational overlay occurs in response to the scene change data indicating a magnitude of the change in the scene falling below a particular level during a period of time.

In another example embodiment, including all previous example embodiments, the at least a portion of the informational overlay comprises an entirety of the informational overlay.

In another example embodiment, including all previous example embodiments, the method further comprises comparing a current version of the scene to a previous version of the scene; and generating the scene change data based on the comparing of the current version of the scene to the previous version of the scene.

In another example embodiment, including all previous example embodiments, the method further comprises accessing movement data indicating movement of the display device; and generating the scene change data based on the movement data.

In another example embodiment, including all previous example embodiments, the movement data indicates translational movement of the display device.

In another example embodiment, including all previous example embodiments, the movement data indicates rotational movement of the display device.

In an example embodiment, a display system comprises one or more hardware processors; and a memory having stored therein instructions that, when executed by at least one of the one or more hardware processors, cause the display system to perform operations comprising causing presentation of an informational overlay atop a scene on a display device, the informational overlay comprising at least one of a graphical element or a textual element to partially obscure the scene; accessing scene change data indicating a change in the scene; and modifying, based on the scene change data, a visual emphasis of at least a portion of the informational overlay relative to the scene on the display device.

In another example embodiment, including all previous example embodiments, the display system further comprises the display device.

In another example embodiment, including all previous example embodiments, the display system further comprises a motion detection device coupled to the display device, the motion detection device is configured to generate movement data indicating movement of the display device, and the operations further comprise generating the scene change data based on the movement data.

In another example embodiment, including all previous example embodiments, the operations further comprise comparing a current version of the scene to a previous version of the scene; and generating the scene change data based on the comparing of the current version of the scene to the previous version of the scene.

In another example embodiment, including all previous example embodiments, the operations further comprise causing presentation of the scene on the display device.

In another example embodiment, including all previous example embodiments, the scene comprises a view of a physical environment; the display device comprises a transparent material through which the physical environment is viewed; the system further comprises a projection device; and the causing of the presentation of the informational overlay atop the scene on the display device comprises projecting the informational overlay using the projection device onto the transparent material.

In another example embodiment, including all previous example embodiments, the scene comprises a view of a physical environment; the display device comprises a transparent material through which the physical environment is viewed, and a light-emitting system coupled to the transparent material, and the causing of the presentation of the informational overlay atop the scene on the display device comprises causing the presentation of the informational overlay using the light-emitting system.

In another example embodiment, including all previous example embodiments, the operations further comprise generating one or more signals including information describing the scene and the informational overlay, and the display device is configured to emit light representing the scene and the informational overlay based on the one or more signals.

In an example embodiment, a non-transitory computer-readable storage medium comprises instructions that, when executed by one or more hardware processors of a machine, cause the machine to perform operations comprising causing presentation of an informational overlay atop a scene on a display device, the informational overlay comprising at least one of a graphical element or a textual element to partially obscure the scene; accessing scene change data indicating a change in the scene; and modifying, based on the scene change data, a visual emphasis of at least a portion of the informational overlay relative to the scene on the display device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain example embodiments are described herein as including logic or a number of components, modules, or mechanisms. Modules may constitute either software modules (e.g., code embodied on a machine-readable medium 1022 or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor 1002 or a group of processors 1002) may be configured by software (e.g., an application or application portion) as a hardware module that operates to perform certain operations as described herein.

In some example embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering example embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the inventive subject matter has been described with reference to specific example embodiments, various modifications and changes may be made to these example embodiments without departing from the broader scope of embodiments of the present disclosure. For example, various embodiments or features thereof may be mixed and matched or made optional by a person of ordinary skill in the art. Such embodiments of the inventive subject matter may be referred to herein, individually or collectively, by the term "invention" merely for convenience and without intending to voluntarily limit the scope of this application to any single inventive concept if more than one is, in fact, disclosed.

The example embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computerized method comprising:
   causing presentation of an informational overlay atop a scene on a display device, the informational overlay comprising at least one of a graphical element or a textual element to partially obscure the scene;
   accessing, using at least one of one or more hardware processors, scene change data indicating a change in the scene and comprising an indication of a portion of the scene;
   identifying at least a portion of the informational overlay based on the indication of the portion of the scene; and
   modifying, using at least one of the one or more hardware processors, based on the scene change data, a visual emphasis of the at least a portion of the informational overlay on the display device relative to the scene.

2. The computerized method of claim 1, further comprising:
   causing presentation of the scene on the display device.

3. The computerized method of claim 1, the modifying of the visual emphasis of the at least a portion of the informational overlay comprising altering a brightness of the at least a portion of the informational overlay.

4. The computerized method of claim 1, the modifying of the visual emphasis of the at least a portion of the informational overlay comprising altering a sharpness of the at least a portion of the informational overlay.

5. The computerized method of claim 1, the at least a portion of the informational overlay comprising text, the modifying of the visual emphasis of the at least a portion of the informational overlay comprising altering a font of the text.

6. The computerized method of claim 1, the modifying of the visual emphasis of the at least a portion of the informational overlay comprising modifying a color of the at least a portion of the informational overlay.

7. The computerized method of claim 1, the at least a portion of the informational overlay at least partially overlapping the indicated portion of the scene.

8. The computerized method of claim 1, the indication of the portion of the scene comprising an indication of an object of interest in the scene.

9. The computerized method of claim 8, the modifying of the visual emphasis of the at least a portion of the informational overlay occurring in response to the object of interest entering a particular area of the scene.

10. The computerized method of claim 8, the modifying of the visual emphasis of the at least a portion of the informational overlay occurring in response to the object of interest exiting a particular area of the scene.

11. The computerized method of claim 8, the modifying of the visual emphasis of the at least a portion of the informational overlay occurring in response to the object of interest encroaching within a particular perceived distance to a vantage point of the scene.

12. The computerized method of claim 8, the modifying of the visual emphasis of the at least a portion of the informational overlay occurring in response to the object of interest exiting from a particular perceived distance to a vantage point of the scene.

13. The computerized method of claim 1, the modifying of the visual emphasis of the at least a portion of the informational overlay occurring in response to the scene change data indicating a magnitude of the change in the scene exceeding a particular level during a period of time.

14. The computerized method of claim 1, the modifying of the visual emphasis of the at least a portion of the informational overlay occurring in response to the scene change data indicating a magnitude of the change in the scene falling below a particular level during a period of time.

15. The computerized method of claim 1, the at least a portion of the informational overlay comprising an entirety of the informational overlay.

16. The computerized method of claim 1, further comprising:
   comparing a current version of the scene to a previous version of the scene; and
   generating the scene change data based on the comparing of the current version of the scene to the previous version of the scene.

17. The computerized method of claim 1, further comprising:
   accessing movement data indicating movement of the display device; and
   generating the scene change data based on the movement data.

18. The computerized method of claim 17, the movement data indicating translational movement of the display device.

19. The computerized method of claim 17, the movement data indicating rotational movement of the display device.

20. A display system comprising:
   one or more hardware processors; and
   a memory having stored therein instructions that, when executed by at least one of the one or more hardware processors, cause the display system to perform operations comprising:
      causing presentation of an informational overlay atop a scene on a display device, the informational overlay comprising at least one of a graphical element or a textual element to partially obscure the scene;

accessing scene change data indicating a change in the scene and comprising an indication of a portion of the scene;

identifying at least a portion of the informational overlay based on the indication of the portion of the scene; and modifying, based on the scene change data, a visual emphasis of the at least a portion of the informational overlay relative to the scene on the display device.

21. The display system of claim 20, further comprising the display device.

22. The display system of claim 20, further comprising a motion detection device coupled to the display device, the motion detection device configured to generate movement data indicating movement of the display device, the operations further comprising generating the scene change data based on the movement data.

23. The display system of claim 20, the operations further comprising:

comparing a current version of the scene to a previous version of the scene; and generating the scene change data based on the comparing of the current version of the scene to the previous version of the scene.

24. The display system of claim 20, the operations further comprising causing presentation of the scene on the display device.

25. The display system of claim 20, wherein:

the scene comprises a view of a physical environment;

the display device comprises a transparent material through which the physical environment is viewed;

the system further comprises a projection device; and the causing of the presentation of the informational overlay atop the scene on the display device comprises projecting the informational overlay using the projection device onto the transparent material.

26. The display system of claim 20, wherein:

the scene comprises a view of a physical environment;

the display device comprises a transparent material through which the physical environment is viewed, and a light-emitting system coupled to the transparent material; and the causing of the presentation of the informational overlay atop the scene on the display device comprises causing the presentation of the informational overlay using the light-emitting system.

27. The display system of claim 20, the operations further comprising generating one or more signals including information describing the scene and the informational overlay, and the display device configured to emit light representing the scene and the informational overlay based on the one or more signals.

28. A non-transitory computer-readable storage medium comprising instructions that, when executed by one or more hardware processors of a machine, cause the machine to perform operations comprising:

causing presentation of an informational overlay atop a scene on a display device, the informational overlay comprising at least one of a graphical element or a textual element to partially obscure the scene;

accessing scene change data indicating a change in the scene and comprising an indication of a portion of the scene;

identifying at least a portion of the informational overlay based on the indication of the portion of the scene; and modifying; based on the scene change data, a visual emphasis of the at least a portion of the informational overlay relative to the scene on the display device.

29. The non-transitory computer-readable storage medium of claim 28, wherein the modifying of the visual emphasis of the at least a portion of the informational overlay comprises altering a sharpness of the at least a portion of the informational overlay.

* * * * *

UNITED STATES PATENT AND TRADEMARK OFFICE
CERTIFICATE OF CORRECTION

PATENT NO. : 10,152,815 B2
APPLICATION NO. : 15/407435
DATED : December 11, 2018
INVENTOR(S) : John Tinsman Page 1 of 1

It is certified that error appears in the above-identified patent and that said Letters Patent is hereby corrected as shown below:

In the Claims

In Column 24, Line 29, in Claim 28, delete "modifying;" and insert --modifying,-- therefor Signed and Sealed this
Fourteenth Day of April, 2020

Andrei Iancu
*Director of the United States Patent and Trademark Office*